March 14, 1933.　　C. MEIER ET AL　　1,901,522
MACHINE TOOL CONSTRUCTION
Filed Oct. 11, 1929　　2 Sheets-Sheet 2
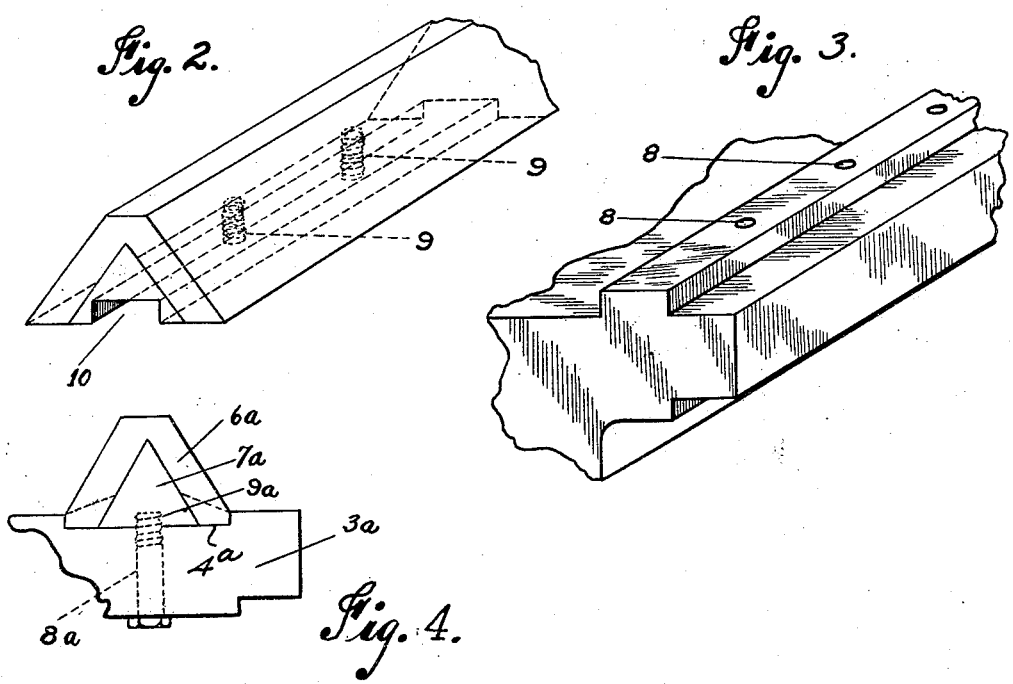
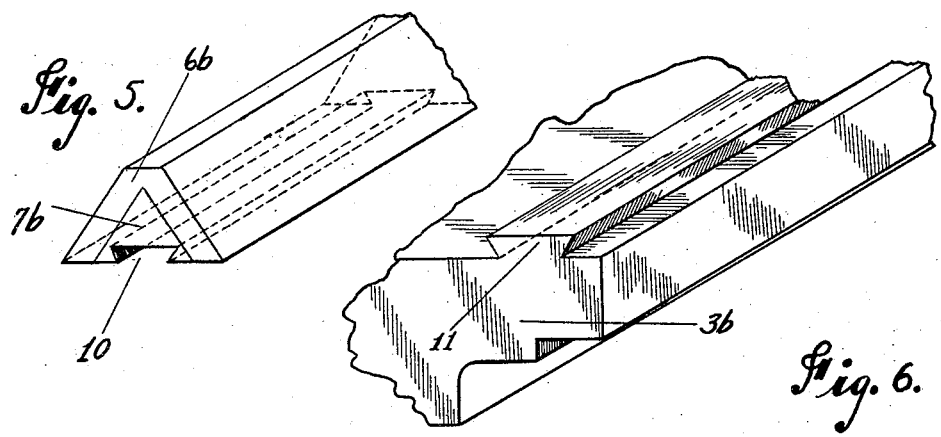
INVENTORS
Charles Meier
BY Theodor A. Wittig
　　Allen & Allen
ATTORNEYS Patented Mar. 14, 1933

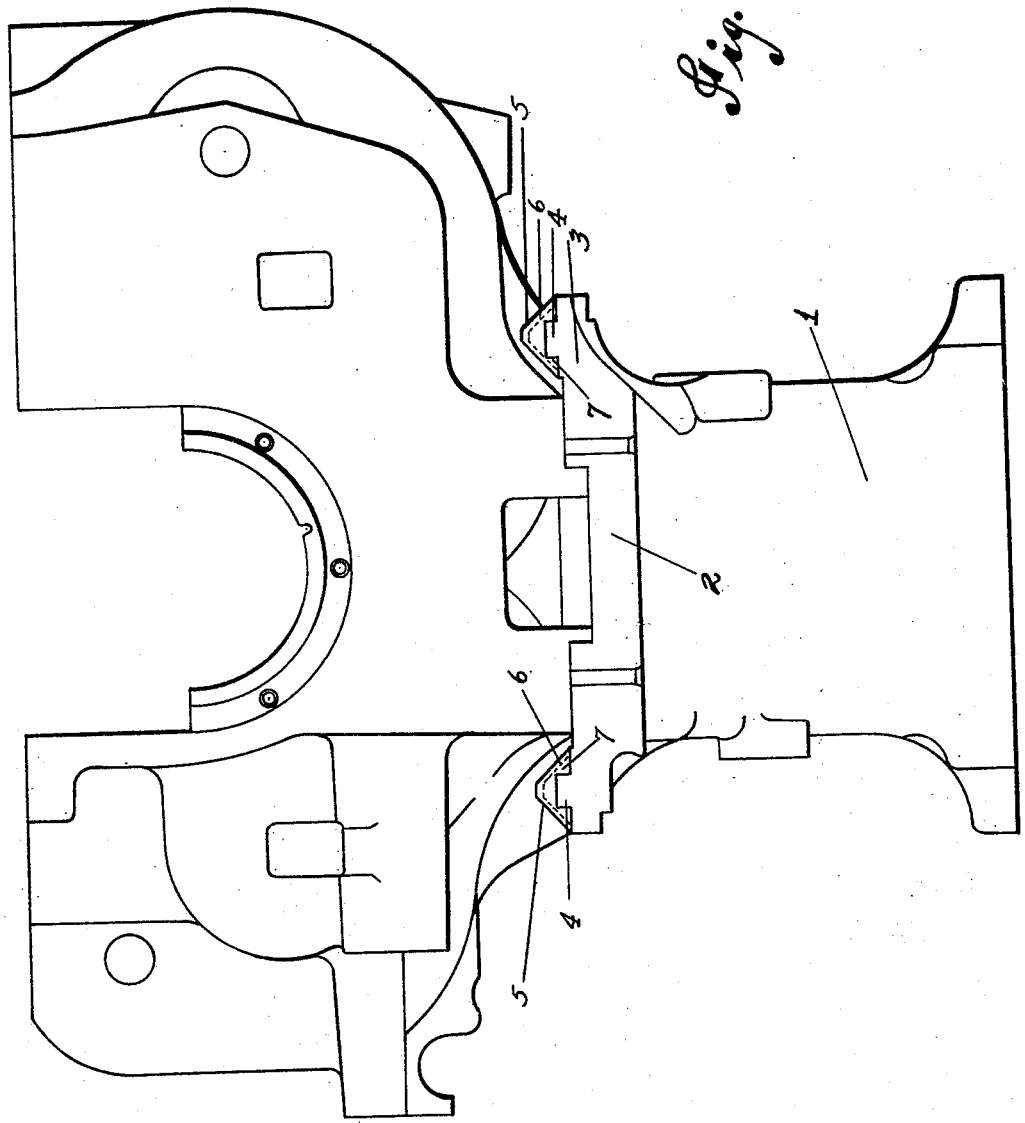

1,901,522

UNITED STATES PATENT OFFICE

CHARLES MEIER AND THEODORE A. WETTIG, OF CINCINNATI, OHIO, ASSIGNORS TO THE ACME MACHINE TOOL COMPANY, OF CINCINNATI, OHIO, A CORPORATION OF OHIO

MACHINE TOOL CONSTRUCTION

Application filed October 11, 1929. Serial No. 399,045.

Our invention relates to machine tool construction and particularly to a novel V support for a machine tool such as a lathe, and to the process of manufacturing said V's.

In the art it is old to provide the bed with V-shaped supports and to securely screw to the V-shaped supports, strips of hard metal which will provide a more lasting slide bearing for the carriage. The ordinary practice of manufacturing machine tools with hard metal V's has been to screw the strips to the V-shaped under support and then to plane off the heads of the screws to provide a V-shaped bearing. Such construction has not been entirely satisfactory since the strips of hard metal tend to separate and cracks are formed between the adjacent edges of the metal strips which collect dirt and grit which acts as an abrasive and impairs the wearing qualities of the V. Further when hard metal strips are screwed to the bed or V-shaped ribs form in the bed, the screw heads do not wear evenly with the hard bearing surface of the strips and formed pockets for dirt and grit.

It is the object of our invention to provide V's for machine tools in which V-shaped bearings of hardened metal are provided which will wear substantially indefinitely. It is specifically our object to provide a machine tool bed with aligning keys or grooves and to form the V's with hard metal upper bearing surfaces but with soft metal bodies which may be accurately positioned relative to the co-operating ribs, keys or grooves of the bed from underneath so that the V's have uniform integral bearing surfaces.

The above objects which will be more definitely pointed out in the ensuing description and other objects such as cheapness of construction and other mechanical improvements, we accomplish by that certain combination, arrangement of parts and method of construction which will be hereinafter described.

Referring to the drawings:

Figure 1 is an end elevation of a turret lathe equipped with our novel V's.

Figure 2 is a perspective view of a fragment of a V made in accordance with our invention.

Figure 3 is a perspective view of a fragment of a supporting bed equipped with an aligning rib to register with the groove in the V shown in Figure 2.

Figure 4 is an end elevation of a modified type of V and supporting bed.

Figure 5 is a perspective view of a still further modified type of V.

Figure 6 is a perspective view of a supporting bed equipped with a dovetail for registry with the dovetail key of the V shown in Figure 5.

The lathe shown has a frame 1 on to which is mounted the bed 2. The bed has side extensions 3 which are suitably reinforced with ribs so as to avoid a tendency to shear off under the great weight of the carriage. In the V shown in Figures 1, 2 and 3, the bed portions 3 are provided with a key or rib 4. The V bearing in which the guiding grooves 5 of the tool carriage have slidable bearing are formed of V-shaped pieces of metal having upper surfaces 6 of hard metal with bodies 7 of soft metal. These V pieces are rolled at the mill and are delivered to the machine tool manufacturer ready for planing and machining. The upper portion of the V is made of hardening steel and the inner portion or body is made of non-hardening soft steel.

The machine tool which is to be equipped with the V's has its registering keys or ribs 4 accurately machined, and holes 8 are drilled in desired position throughout the length of the key. After hardening the bearing surfaces, the V's are accurately finished and the slot 10 is cut and the holes 9 are accurately located and drilled and tapped in the soft body portions 7. The V's are then mounted on the keys 4 of the side extensions 3 of the bed, which have holes 8 registering with the threaded holes 9 of the V's and machine screws are inserted up through the holes 8 and screwed into the threaded holes to securely fasten the V's to the bed.

Instead of providing the bed with upstanding ribs or keys, we may (Fig. 4) machine a groove 4a in each one of the bed extensions 3a and sink therein a V having upper hard metal bearing surface portions 6a and a soft body portion 7a provided with threaded holes 9a to register with the holes 8a in the bed.

A still further modification of a bed provided with cooperating aligning devices to register with portions of a V is shown in Figures 5 and 6. In the latter modification the V pieces have hard metal upper bearing surface portions 6b, and soft body portions 7b with dovetail slots 10 which fit onto dovetail keys 11 formed on the bed extension 3b. The V's in this modification are slid into position on the bed from the end and may then be securely fastened in position in any suitable manner, as by the screws of the previous examples.

In our process of manufacturing machine tools with our novel V slide ways, it is important that the registering holes in the soft bodies of the V pieces be tapped, and that the grooves be accurately machined in the body after the V has been subjected to the hardening treatment as otherwise the heat treatment would distort the grooves or throw the holes out of alignment with the holes in the bed.

It will be apparent that other means for aligning the V's on the bed may be provided in addition to the several modifications which have been shown.

Having thus described our invention, what we claim as new and desire to secure by Letters Patent, is:—

1. In the construction of a V slideway for a machine tool the steps which include machining a V piece formed with upper surface portions of hardening metal and inner body portions of non-hardening soft metal, subjecting the piece to a treatment to harden the upper surface portions, and then machining the soft metal body for the reception of attaching means.

2. In the construction of a V slideway for a machine tool the steps which include providing the bed with an aligning and registering device, machining a V piece formed with upper surface portions of hardening metal and inner body portions of non-hardening soft metal with means to cooperate with the aligning device of the bed, then subjecting the piece to a treatment to harden the upper surface portions thereof and then securing the inner body portions of the piece on the bed.

3. In the construction of a V slideway for a machine tool the steps which include machining a V piece formed with upper surface portions of hardening metal and inner body portions of non-hardening soft metal, subjecting the piece to a treatment to harden the upper surface portions, and then machining the soft body for aligning said V's on a machine bed, and then tapping holes in the soft body for the reception of attaching screws.

4. In the construction of a V slideway for a machine tool, the steps which include machining a V piece formed with upper surface portions of hardening steel and inner body portions of non-hardening soft metal, subjecting the piece to a treatment to harden the upper surface portions, and then machining the soft metal body for attachment to a machine tool bed.

5. A V slideway for a machine tool comprising, in unitary relation, an upper surface portion of hardening steel and an inner body portion of non-hardening soft metal machined for attachment to a machine tool bed.

6. A bearing surface element for a machine tool comprising, in unitary relation, a bearing surface portion of hardening steel, and a portion for attaching said element to a machine tool bed, composed of non-hardening soft metal adapted to be machined after hardening of the bearing surface portion.

CHARLES MEIER.
THEODORE A. WETTIG.